(12) United States Patent
Hoover et al.

(10) Patent No.: US 6,396,532 B1
(45) Date of Patent: May 28, 2002

(54) COMPUTER CONTROLLED VIDEO MICROSCOPY SYSTEM

(76) Inventors: Rex Hoover; Robert G. Hoover, both of 5263 Stewart Rd., Sumerduck, VA (US) 22742

( * ) Notice: Subject to any disclaimer, the term of this patent is extended or adjusted under 35 U.S.C. 154(b) by 0 days.

(21) Appl. No.: 09/410,749

(22) Filed: Oct. 1, 1999

(51) Int. Cl.[7] .................................................. H04N 7/18
(52) U.S. Cl. ......................................... 348/79; 359/372
(58) Field of Search ........................... 348/79; 359/372, 359/373, 379, 381, 382; H04N 7/18

(56) References Cited

U.S. PATENT DOCUMENTS 4,160,263 A * 7/1979 Christy et al. ................. 348/79
5,051,825 A * 9/1991 Cochran et al. ............... 348/79

* cited by examiner

*Primary Examiner*—Young Lee
(74) *Attorney, Agent, or Firm*—C. C. Shroff; Papan Devnani, Esq.

(57) ABSTRACT

A microscopy system, comprising a stage for supporting a sample; a means for directing a vertical beam of light through the sample; a means for observing an image carried by the beam of light; and an optical system. The optical system features:

i) a plurality of light-transmitting objective lenses arranged in a linear array on a first plate, including at least a first objective lens positioned in the path of the vertical beam of light and a second objective lens not positioned in the path of the vertical beam of light; and ii) a lens system adapted to receive the vertical beam of light after it has been transmitted through the first objective lens and focus the vertical beam of light onto the imaging plane of the video camera.

A second plate which is rigidly connected with the lens system is slidably fixed to the first plate by means of linear bearings, allowing the first plate to move along the second plate until the first objective lens moves out of the path of the vertical beam of light and the second objective lens moves into the path of the vertical beam of light. The first plate may be caused to move along the second plate until the first objective lens moves out of the path of the vertical beam of light and the second objective lens moves into the path of the vertical beam of light. Exchange of objective lenses in this fashion is normally carried out under computer control.

17 Claims, 10 Drawing Sheets

Figure 5 : Industrial Stage (exploded)

Figure 6 : Industrial Stage with rotating chuck

COMPUTER CONTROLLED VIDEO MICROSCOPY SYSTEM

FIELD OF THE INVENTION

The invention relates to a computer-controlled, modular microscopy system that produces a magnified video image of a specimen of interest. The positions of all moving parts of the microscope are controlled from a computer.

The invention also relates to an optical system for use with a video camera, where the optical system magnifies an image to be recorded by the camera.

BACKGROUND OF THE INVENTION

Microscopes are conventionally-used optical instruments in a variety of fields where workers need clear images of structures too small to be seen by the naked eye. For example, medical professionals, biologists, and cytologists conventionally use microscopes to observe cell cultures or uni- or multicellular organisms, while electronics specialists conventionally use microscopes to study silicon wafers.

State-of-the-art microscopes consist of several assemblies that are attached to provide a functioning system. The major assemblies are the stand, a stage adapted to hold a sample, a lens turret having one or more objective lenses, an observation tube having one or two ocular lenses, and a means of illuminating a sample. The objective lens magnifies an image of the sample; the magnified image is then directed into the observation tube.

The foundation for a conventional microscopy system is the stand, which typically accounts for about 25% of the system price. The stand provides a stationary platform to hold the imaging and illumination optics. The stage is typically attached to the stand using a rack-and-pinion structure. This allows the stage to travel vertically toward the objective lens, or away from the objective lens, so as to focus the sample image seen through the observation tube.

The stage and observation tube may be arranged in either of two ways. In an upright microscope, the stage is positioned beneath the observation tube, with the objective lens being directed toward the sample. In an inverted microscope, the stage is positioned above the observation tube, with the objective lens being directed toward the sample. Whether the microscope is upright or inverted, the sample may be illuminated by transmitted fight or by incident. In a transmitted light illumination system, a beam of light bearing an image of the sample is produced by shining a beam of light through the sample. In a incident light system, a beam of light bearing an image of the sample is produced by reflecting a beam of light off of the sample.

In addition to the above-described components, accessory assemblies such as still or video cameras, filters, or polarizers may be added to the microscope. Cameras are particularly useful accessories, as they allow a researcher to record an image for later study. However, most microscopes are designed to permit viewing of an image by the human eye, forcing the researcher to set up a special apparatus to support the camera above the ocular lens, and then carefully focus the image onto the imaging plane of the camera.

It is also known to control the distance between the microscope stage and the objective lens by computer, so as to provide automatic focus. For example, if the computer determines that the distance between the microscope stage and the objective lens is incorrect for the objective lens, the computer can send a signal to a motor which moves the stage toward or away from the objective lens. The microscope may have a mechanism for movably supporting a plurality of objective lenses so that one objective lens having a defined magnification is in the path of a light beam at any given time. If a lens having the wrong magnification is in the optical path, a signal is sent from the computer to a motor which causes the lens-supporting mechanism to move the incorrect lens out of the optical path, and move a lens having the desired magnification into the optical path. Typically, the lens supporting mechanism is a revolving device which rotates about an axis which is coaxial with the axis of the observation tube. The objective lenses are directed at an angle relative to this axis, so that each may be rotated into the path of the incoming light beam. As a result, the light beam, after it passes through the objective lens and before it enters the observation tube, must be bent using a system of mirrors or prisms. This requirement for additional precision optical components adds to the expense and complexity of the system. It is therefore desirable to create a microscope having a means for exchanging microscope objective lenses under computer control which does not require the use of optics to bend the incoming light beam.

Additionally, people that use optical microscopes have long been asking microscope designers to make microscopes more suitable for human use. The typical microscopist sits hunched over on a laboratory stool, peering downward through the ocular lens of his microscope, in a position guaranteed to cause severe back pain, neck pain, and/or eye strain. In fact, K. S. Lee and L. A. Humphreys, at the 29th Annual Meeting of the Proceedings of the Human Factors Society, reported that 84% of microscopists had job-related musculoskeletal pain. This forces many or most microscopists to leave the profession in considerably under ten years. In many cases, back or neck surgery is necessary to relieve job-related pain sufficiently to allow the microscopist to lead a normal life.

It has been suggested that this sorry statistic could be greatly reduced by using microscopes that display images on computer monitors. Additionally, conventional bench microscopes are designed so that handicapped people or people confined to wheelchairs have trouble reaching the eyepiece, making it difficult for them to pursue careers in microscopy. It is necessary to develop microscopes that can readily be used by the disabled. Microscopes that display images on computer monitors can be used in this way.

SUMMARY OF THE INVENTION

The invention is directed to a computer-controlled microscopy system, featuring a stage for supporting a sample; a means for directing a vertical beam of light through the sample; a means for observing an image carried by the beam of light; and an optical system. The optical system includes:

i) a plurality of light-transmitting objective lenses arranged in a linear array on a first plate, including at least a first objective lens positioned in the path of the vertical beam of light and a second objective lens not positioned in the path of the vertical beam of light; and ii) a lens system adapted to receive the vertical beam of light after it has been transmitted through the first objective lens and focus the vertical beam of light onto the imaging plane of the video camera.

A second plate which is rigidly connected with the lens system is slidably fixed to the first plate by means of linear bearings, allowing the first plate to move along the second plate until the first objective lens moves out of the path of the vertical beam of light and the second objective lens moves into the path of the vertical beam of light. The first plate may be caused to move along the second plate until the first objective lens moves out of the path of the vertical beam of light and the second objective lens moves into the path of the vertical beam of light. Exchange of objective lenses in this fashion is normally carried out under computer control.

The technology used in this invention is similar to that used in the microscope described in U.S. Pat. No. 5,818,637, the entire disclosure of which is incorporated herein by reference.

DESCRIPTION OF THE INVENTION

Figure 1:
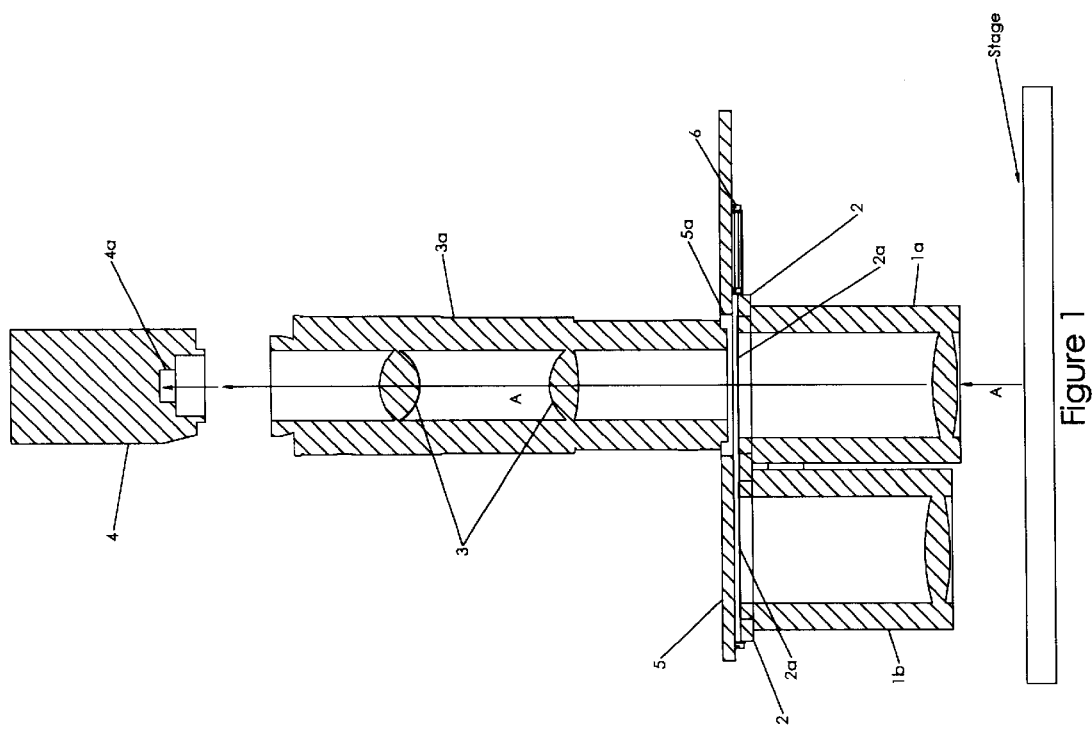
FIG. 1 illustrates a microscope according to this invention, featuring a first plate supporting a plurality of objective lenses which is movable to a second plate.

This invention is a microscopy system having an improved apparatus for exchanging objective lenses. The apparatus, shown in FIG. 1 comprises a stage for supporting a sample; a means for directing a vertical beam of light through the sample (not shown in FIG. 1); a video camera having a defined imaging plane; and an optical system designed to focus the vertical of light onto the imaging plane of the camera. The optical system includes a plurality of light-transmitting objective lenses arranged in a linear array on a first horizontal plate 2, including a first objective lens 1a positioned in the path "A" of the vertical beam of light and one or more objective lenses 1b not positioned in the path of the vertical beam of light. Openings 2a are positioned in the first plate, one behind each light-transmitting objective lens. A lens system 3 is positioned in a tube 3a having an axis which is parallel to the vertical beam of light. The lens system 3 receives the vertical beam of light after it has been transmitted through the first objective lens, and focuses the vertical beam of light onto the imaging plane 4a of video camera 4. A second plate 5 is rigidly fixed to the tube containing the lens system. The second plate occupies a horizontal plane, and has an opening 5a which allows the vertical light beam to enter the tube and reach the lens system therein. The first plate 2 is slidably fixed to the second plate 5 by means of linear bearings 6 so that the first plate may move along the second plate until the first objective lens 1a moves out of the path of the vertical beam of light and another selected objective lens 1b moves into the path of the vertical beam of light. Preferably, high-precision crossed roller bearings or linear recirculating ball bearings are used here. The microscope may be constructed with only two exchangeable objective lenses, as seen in FIG. 1, or more that two objective lenses may be used.

The microscope additionally comprises a means for moving the first plate along the second plate until the first objective lens moves out of the path of the vertical beam of light and the other selected objective lens moves into the path of the vertical beam of light under computer control. The means for moving the first plate along the second plate, shown in FIG. 2, typically features a stepper motor 7; a threaded screw 8 which is parallel to the linear bearings and rotated by the stepper motor; a threaded nut 9 driven by the screw, and a computer (not shown in the figure). The nut 9 is rigidly connected with the first plate 2 by means of bracket 9a, and the stepper motor 7 is rigidly connected with the second plate. Rotation of the screw moves the nut along the screw, and causes the first plate to move relative to the second plate along the linear bearings. The computer signals the stepper motor to rotate the screw at a predetermined rate in a first direction until the nut moves the first plate from a position in which the first objective lens 1a is positioned in the path "A" of the vertical beam of light to a position in which a different objective lens 1b is positioned in the path of the light beam. If it is desired to move the first objective lens back into the path of the light beam, the computer signals the stepper motor to rotate the screw in a reverse direction until the screw drives the second plate into a position in which the first objective lens 1a is again positioned in the path of the light beam.

Figure 2:
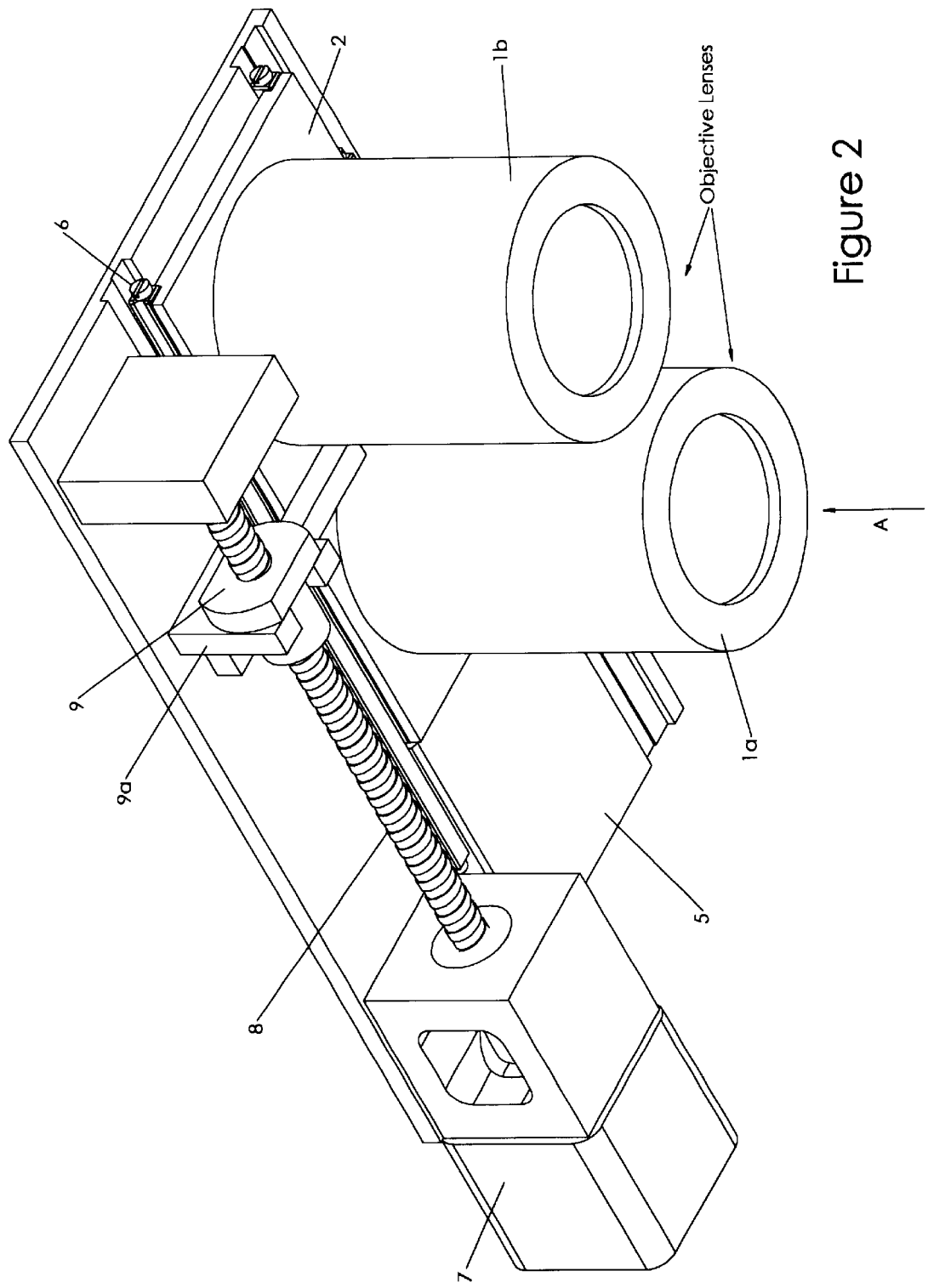
FIG. 2 illustrates a mechanism for moving the first plate of FIG. 1 relative to the second plate.
Figure 3:
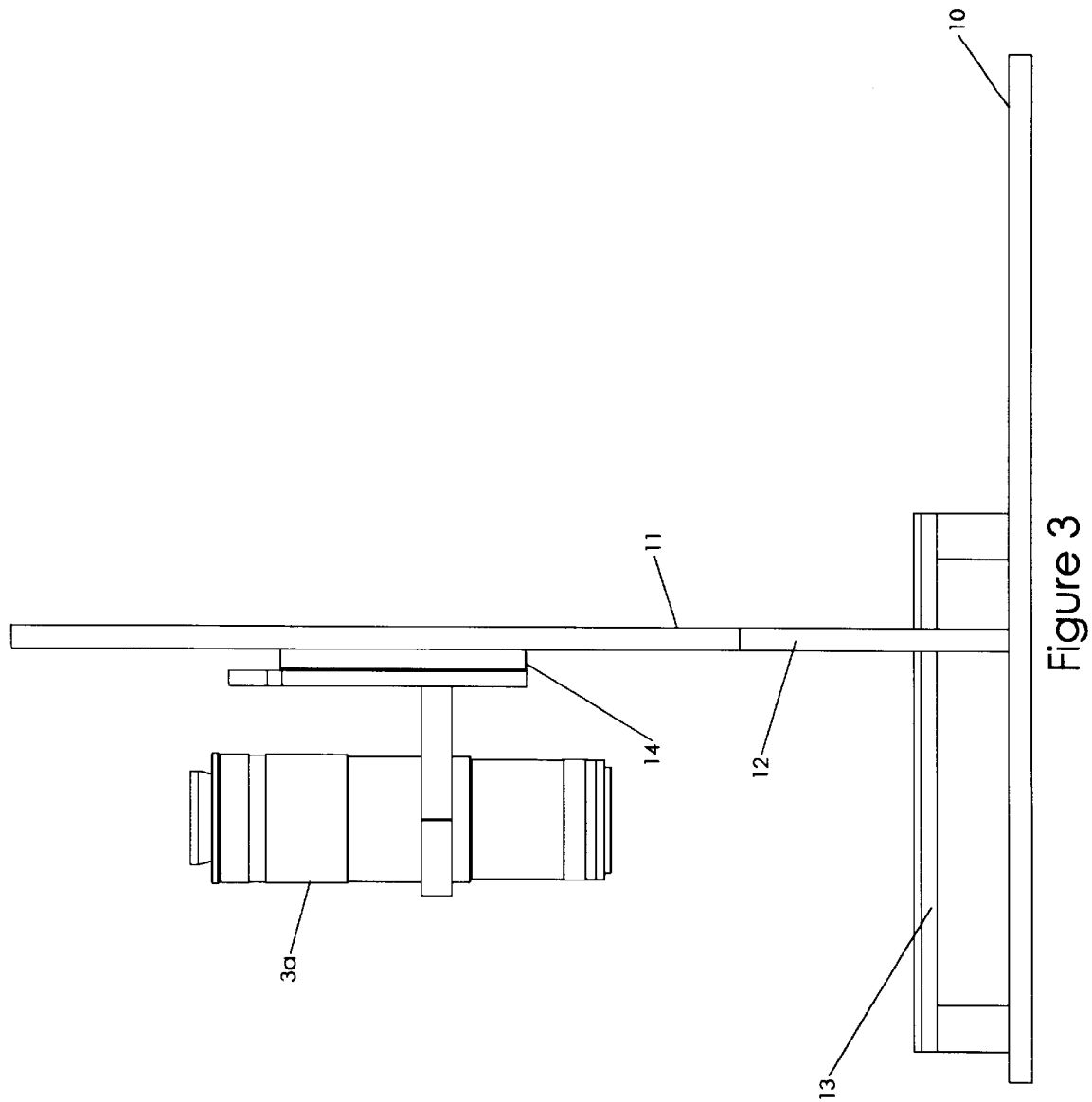
FIG. 3 illustrates a microscope stand adapted to support the microscope of FIG. 1.

The microscope stand used in this invention, shown in FIG. 3, is much simpler than currently-used microscope stands. The stand comprises a horizontal base plate 10, and a vertical plate 11 suspended above the base plate by support 12. For an upright microscope, the horizontal plate is the mounting surface for a horizontal stage 13. The vertical plate is rigidly suspended above the base plate, and the tube 3 containing the lens system is mounted on the vertical plate. The objective lens assembly of FIG. 2 is not shown in FIG. 3.

Figure 4:
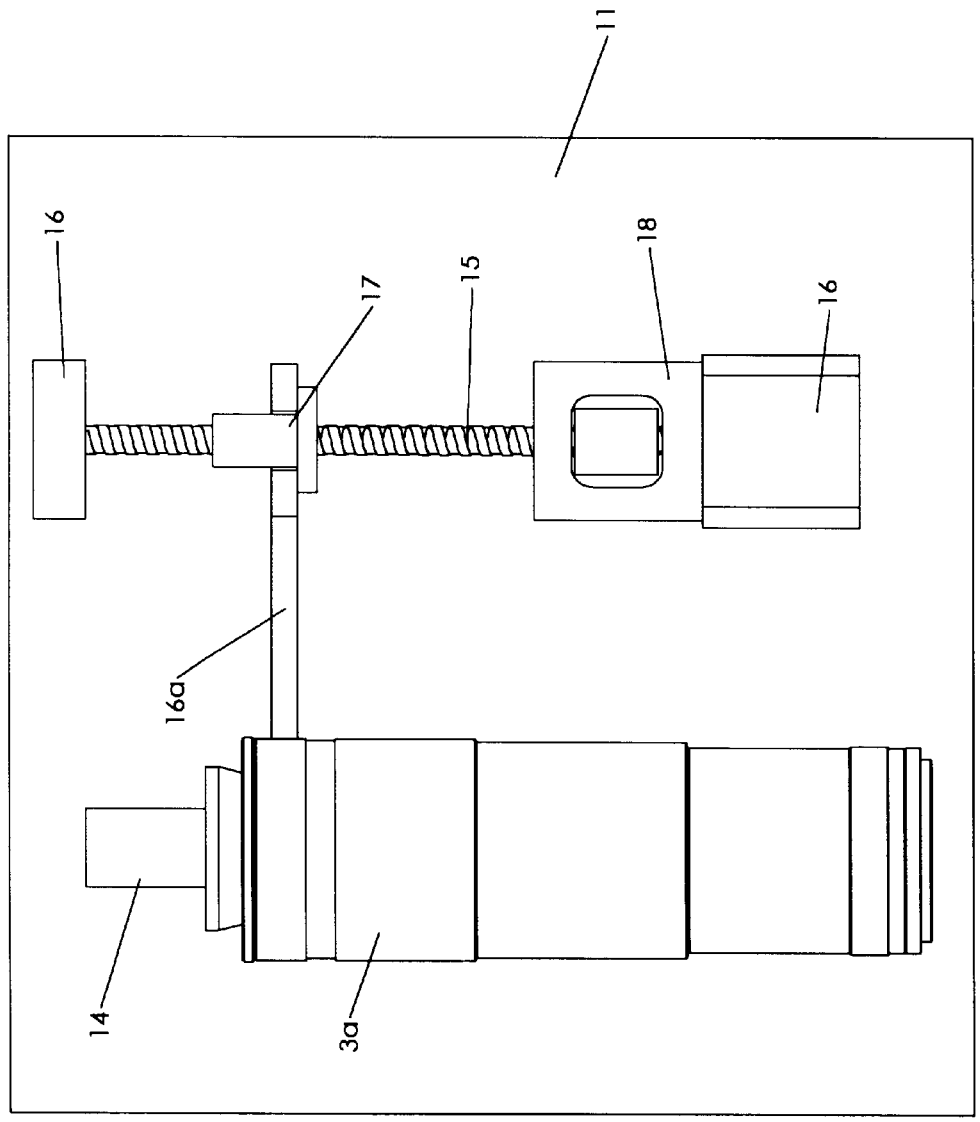
FIG. 4 illustrates a mechanism for adjusting the focus of the microscope.

The tube containing the lens system is mounted on the vertical support plate using linear bearings 14 in such a way that the tube may travel vertically on the plate. This allows one to adjust the focus of the microscope by varying the distance between the sample and the objective, and as a result, varying the length of the path of the light beam from the sample to the video camera. Again, recirculating ball bearings or crossed roller bearings are preferred. Travel of the tube is achieved by means of a threaded vertical screw 15, rotatably mounted on the vertical plate by brackets 16, as shown in FIG. 4. A nut 17 driven by the threaded vertical screw 15 is rigidly attached to the tube 3a by bracket 16a. A stepper motor 18 is used to rotate the vertical screw. When the screw is rotated, the nut and the tube attached thereto travel vertically on the screw 15. Preferably, a ball screw and a recirculating ball nut are used. The stepper motor is preferably an electronically-driven 0.45° stepper motor. This allows the tube 3a to be positioned with a high degree of accuracy. Resolution of tube position is approximately 0.5 micrometers/step.

If a reduced degree of precision is acceptable in positioning the tube, a conventional screw and a threaded nut may be used. Alternatively, a rack-and-pinion system may be used to move the tube. This system would comprise a vertical rack mounted on the vertical plate and a rotatable pinion engaging the rack, said pinion being attached to the tube. A stepper motor may be used to rotate the pinion. This mechanism is less precise than the screw-and-nut system, and is therefore less preferred.

In an upright microscope, the stage is mounted to the horizontal plate, and is positioned immediately below the objective lens assembly. In an inverted microscope, the stage is mounted above the objective lens assembly. The stage is adapted to support one or more samples, and is able to move the sample in a horizontal plane so as to correctly position the sample in the microscope's field of view.

Figure 5:
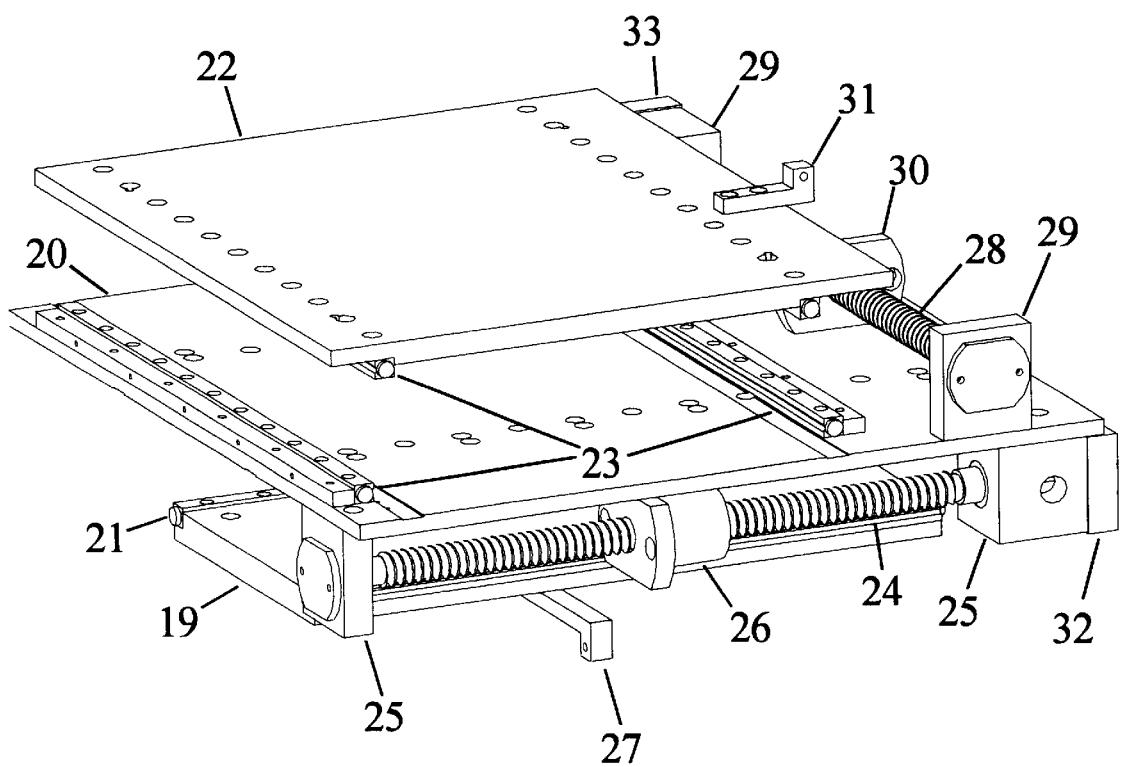
FIGS. 5 and 6 illustrate two embodiments of a stage used for supporting a sample to be observed using the microscope of FIG. 1.

The stage is constructed from three plates, and will be described for an upright microscope. An exploded view of the stage is seen in FIG. 5. A first horizontal support plate 19 is rigidly mounted above the horizontal plate 10 (not shown in FIG. 5). A second horizontal plate 20 is then mounted on the first support plate using linear bearings 21. These linear bearings are preferably high-precision crossed roller bearings or linear recirculating ball bearings. The linear bearings allow plate 20 to move horizontally in the y-direction, relative to plate 19. A third horizontal plate 22 is then mounted on plate 20 using linear bearings 23. These bearings allow plate 22 to move horizontally in the x-direction, which is orthogonal to the y-direction. By moving plates 20 and 22 in mutually orthogonal directions, plate 22 may be moved freely to any position in a defined field of from 10 cm×10 cm up to 90 cm×90 cm. Plates 19, 20, and 22 should be able to transmit light if illumination by transmitted light is contemplated; if only incident light illumination is to be used, the plates may be opaque.

Figure 6:
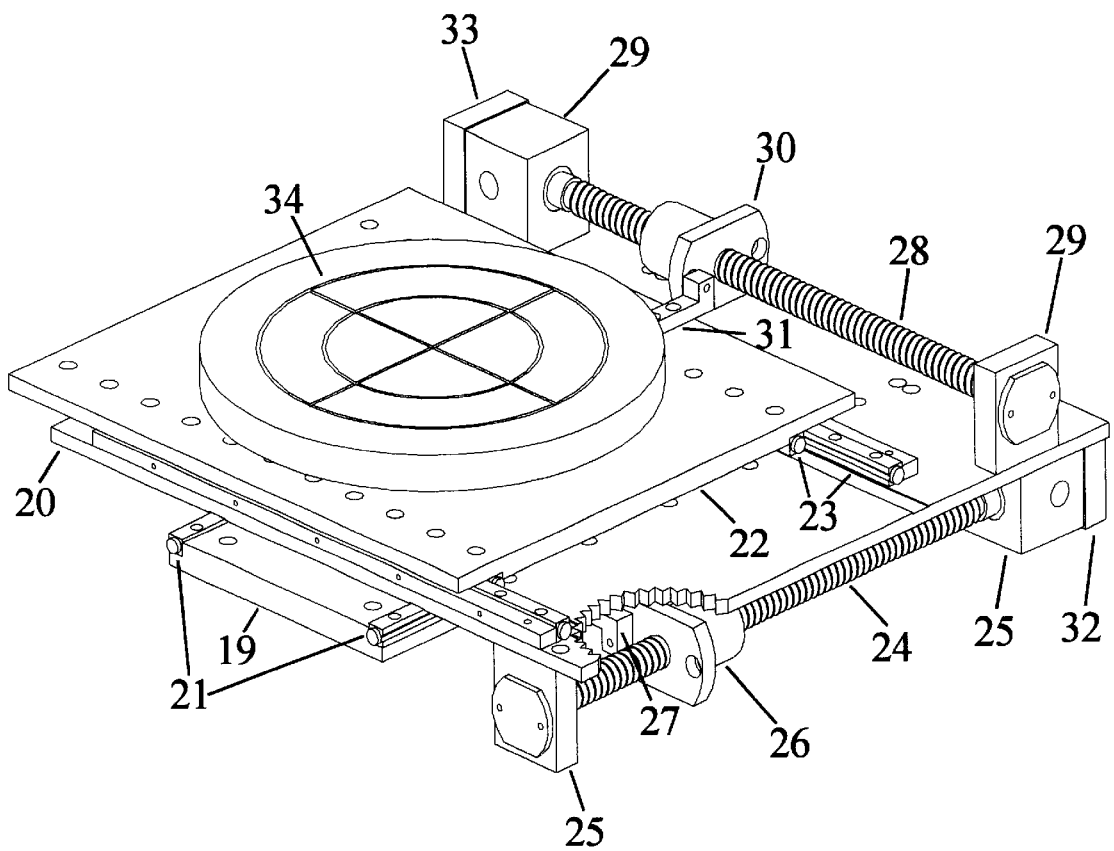

The stage assembly also includes a means for driving plate 20 in the y-direction and a similar means for driving plate 22 in the x-direction. The means for driving plate 20 comprises a horizontal threaded screw 24 rotatably mounted on the plate 19 by means of brackets 25. The axis of screw 24 is parallel to the y-direction. A nut 26 driven by the first screw 24 is rigidly attached to plate 20 by means of bracket 27. Rotation of screw 24 causes nut 26 to travel in the y-direction, carrying plates 20. Reversal of the direction of rotation of screw 24 causes nut 26 to reverse its direction of travel. Screw 24 is preferably a ball screw and nut 26 is preferably a recirculating ball nut; however, conventional screws and nuts may be used instead. Plate 22 is driven in a similar fashion. A second screw 28 is totatably mounted on plate 20 by means of brackets 29, with its axis pointed in the x-direction. A second nut 30 driven by the screw 28 is rigidly attached to plate 22 by means of bracket 31 (Due to the exploded view in FIG. 5, bracket 31 is only shown as being attached to plate 22; it is in point of fact also attached to nut 30. FIG. 6 shows the correct attachment of bracket 31 to plate 22 and nut 30.). If desired, a rack-and-pinion system may be used to drive plates 20 and 22, instead of screws.

Screws 24 and 28 are rotated by stepper motors 32 and 33. Preferably, the stepper motors are electronically driven and have a 0.9 degree step angle. Use of such a motor allows the stage to be positioned with excellent resolution. For example, let us suppose that plate 22 is driven by a ball screw 28 having 2 mm pitch. Such a ball screw will drive plate 22 2 mm/revolution. Driving screw 28 with a stepper motor 33 having a 0.9° step angle (400 steps/revolution) will result in a minimum movement of plate 22 of 5 micrometers. Employing quarter-step drive electronics increase the number of steps/revolution to 1600, reducing the minimum plate movement by a factor of 4. Microstepping drive electronics can increase the steps/revolution by orders of magnitude; however, this significantly increases the system cost.

The stage can also be adapted to rotate a sample, if desired. This is useful in studies of semiconductor wafers. For example, a rotating vacuum chuck 34 may be mounted on plate 22 via a rotary bearing (FIG. 6; rotary bearing is not shown). The rotary bearing also provides the required vacuum seal. A stepper motor (not shown) mounted under plate 22 is used to rotate chuck 34. The drive shaft of the motor passes through plate 22, and is rigidly attached to the underside of chuck 34. Alternatively, rotation of a sample may be achieved by mounting plate 19 on plate 10 via a rotary bearing, rather than rigidly securing plate 19 to plate 10. The drive shaft of a stepper motor mounted to plate 10 is connected to the underside of plate 19, and may be used to achieve rotation of plate 19.

Figure 7:
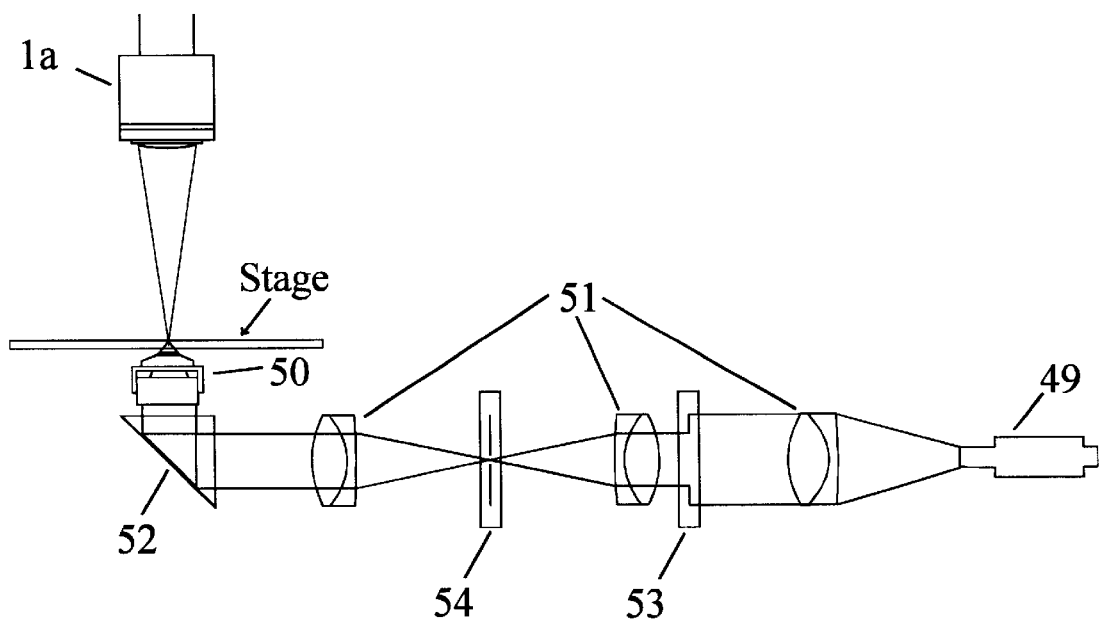
FIG. 7 illustrates a sample illumination system.

An illumination system adapted to illuminate a sample using transmitted light is illustrated in FIG. 7. The illumination system includes a light source 49, a condenser lens 50, and a lens system adapted to transmit a beam of light from the light source to the condenser lens. The light source is typically a fiber optic light guide, although other types of light sources may be used. Condenser lens 50 is positioned beneath the stage, and is directed upward through the stage toward objective lens 1a. The condenser lens 50 collects and concentrates the beam of light received from the lens system and directs the concentrated beam of light vertically through the stage. The concentrated light beam passes through a sample on the stage and enters the tube 3a through the objective lens 1a, whereupon the previously described imaging system focuses the light beam onto the imaging plane of video camera 4.

The lens system for the transmitted light illuminating system is positioned horizontally under the stage, in a defined channel. The elements of the lens system typically include:

a) a plurality of lenses 51 adapted to direct a beam of light from the light source horizontally through channel 6;

b) a right-angle prism or mirror 52 adapted to bend the light beam upwards at a right angle toward condenser lens 50;

c) an aperture diaphragm 53 positioned near the entrance to channel 5 adapted to control the numerical aperture of the light which is allowed to enter channel 5; and d) a field diaphragm 54 positioned between diaphragm 28 and prism or mirror 27 adapted to ensure that the microscope's entire field of view is illuminated. Lenses 51 focus the beam of light from the light source through the field diaphragm 54, and then collimate the beam of light and direct it onto prism 52, which bends the light beam towards condenser 50. Diaphragm 53 controls the angle theta made by the beam of light with the axis of the channel as it passes through diaphragm 54.

The condenser lens 50 may be a single lens, or it may be made up of several lenses. In a preferred embodiment, shown in FIG. 8, the condenser lens may be a system of lenses, including a first lens 50a positioned in the path "A" of the beam of light from the light source, and a second lens 50b, also positioned in the path of the beam of light. Lens 50b is positioned between the lens 50a and the light-transmitting stage (not shown in FIG. 8). Lens 50b may be moved out of the path of the light beam if it desirable to use lens 50a as the sole condenser lens. Lens 50a is normally used without lens 50b (commonly called a cap lens) when even illumination of a comparatively large portion of a sample is desired. This is particularly useful when a sample is examined using a low power objective lens. When intensely focused illumination of a small portion of the sample is desired, lens 50b may be moved out of the path of the light beam, and lenses 50a and 50b are used together as the condenser lens system. This is desirable when examining specific details of the sample using a high power objective lens.

Lens 50a is positioned in a horizontal frame 50c located in the path of the beam of light from the light source. The frame 50c supporting lens 50a is mounted to a rigid plate 99 using linear bearings 96, so that lens 50a is positioned above a rigid housing 98 which supports right angle prism 52

Figure 8:
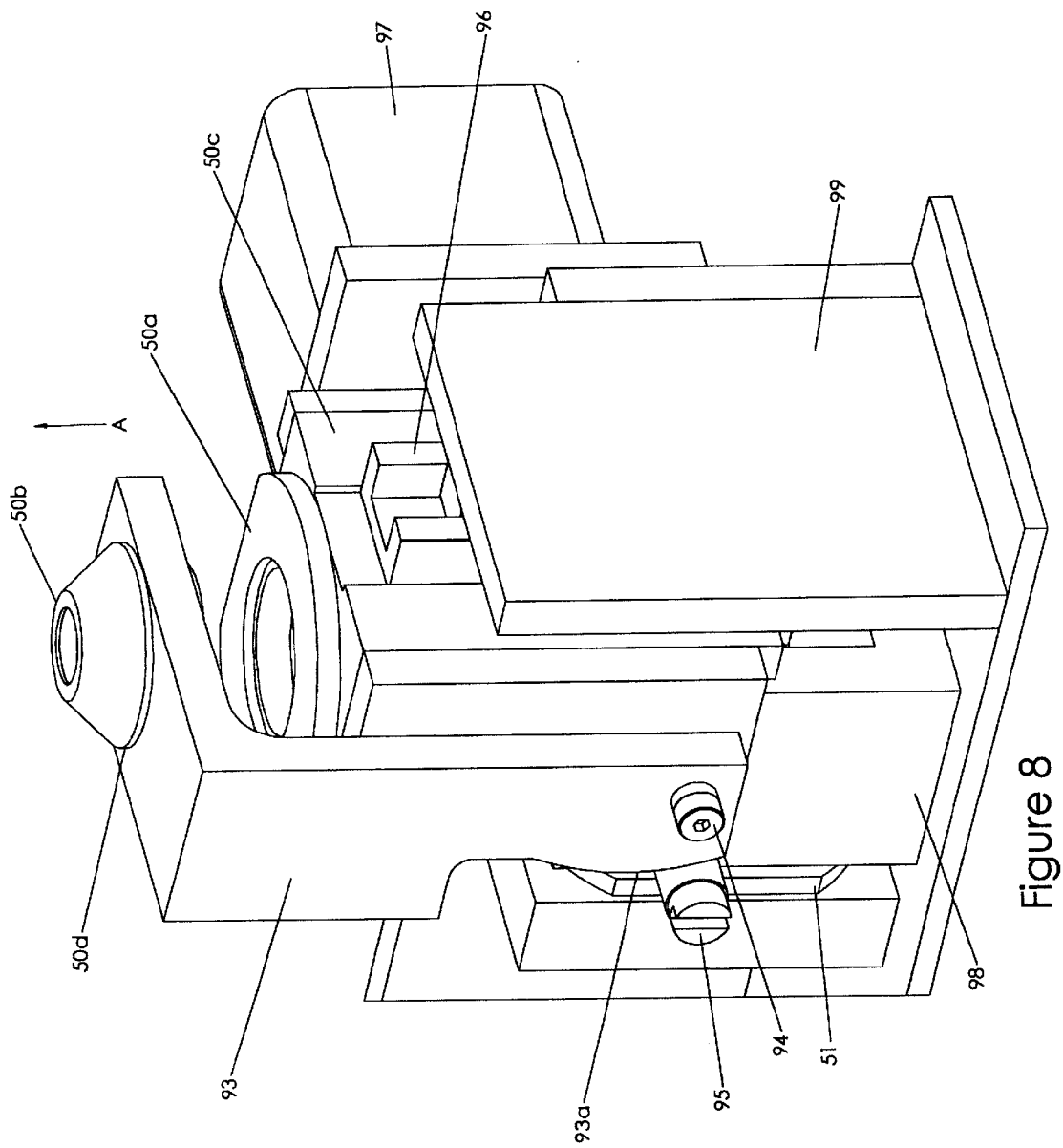
FIGS. 8 through 10 a compound condenser lens to be used in the sample illumination system of FIG. 7.

(prism not shown in FIG. 8). This allowing the lens 50a to move vertically relative to housing 98. The vertical motion is controlled using a stepper motor 97 under computer control. A vertical rack rigidly connected to the frame 50c interacts with a pinion rotated on the stepper motor (rack and pinion are not shown in FIG. 8). The stepper motor responds to signals from a computer. A beam of light passes through a lens 51 (shown positioned in a square frame in FIG. 8), and then enters housing 98 from the side. The right angle prism deflects the beam upward through an opening in the upper surface of housing 98. The beam then passes through lens 50a towards the stage.

Figure 9B:
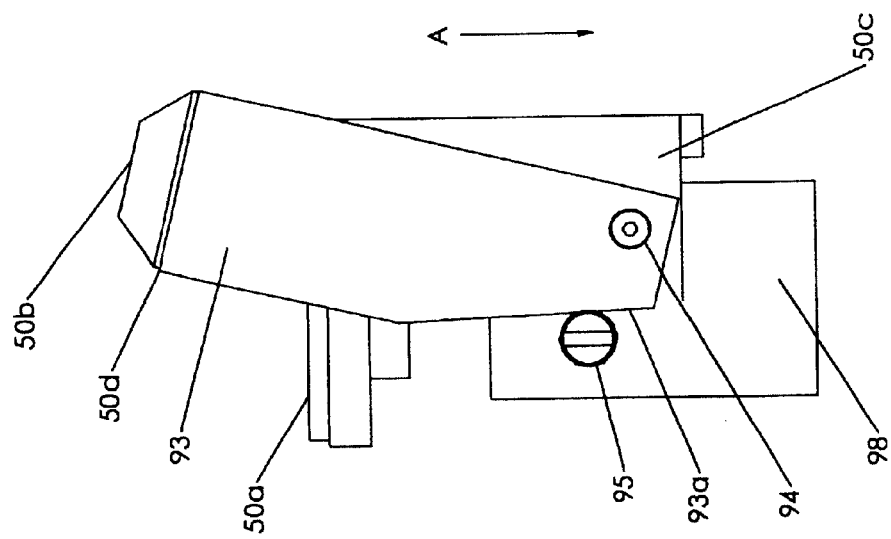
Figure 9A:
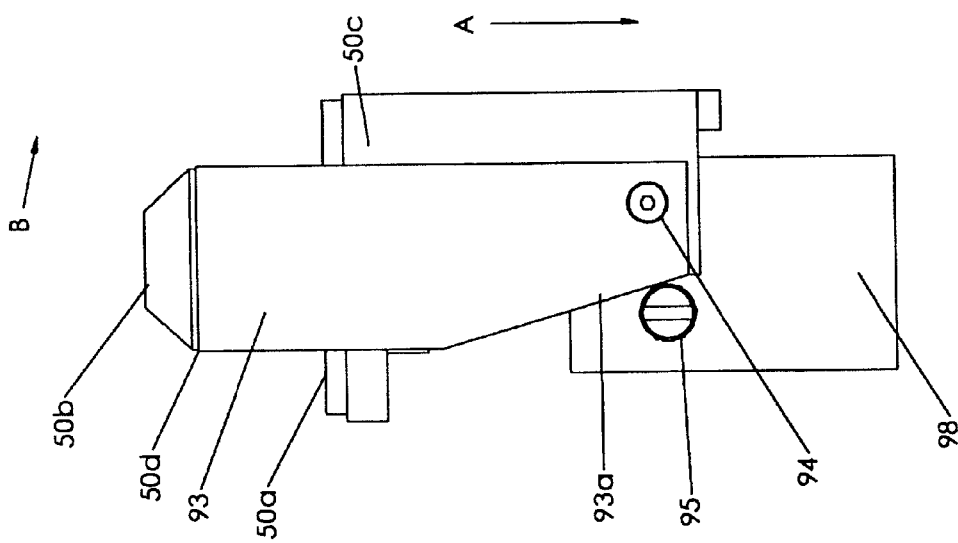

A second lens 50b is mounted in a second frame 50d. Frame 50d is rigidly attached to a bar 93, which is connected to the frame 50c by means of a hinge 94. The hinge 94 allows the bar to swing from a first position where lens 50b is positioned in the path of the light beam to a second position where lens 50b is not positioned in the path of the light beam. Bar 93 additionally features a shaped edge surface 93a which interacts with an immobile pin 95 so that, when frame 50c moves downwards in the direction of arrow A from a first frame position (FIG. 9a) to a second flame position (FIG. 9b), pin 95 pushes against edge 93a so as to cause bar 93 to swing in the direction of arrow B from its first position to its second position. For example, edge 93a may be a straight edge which makes a 30° angle with the vertical direction, as in FIG. 17. The user of the microscope determines whether or not lens 50b should be used or not. The computer then sends a signal to the stepper motor to move the frame 50c into the first frame position if the operator chooses to use lens 50b, or sends a signal to the stepper motor to move the frame 50c into the second frame position if the operator chooses not to use lens 50b. By moving frame 50c downwards at the same time that the bar 93 swings outwardly, interference between the lower surface of the stage and the lens 50b in frame 50d is avoided.

Figure 10C:
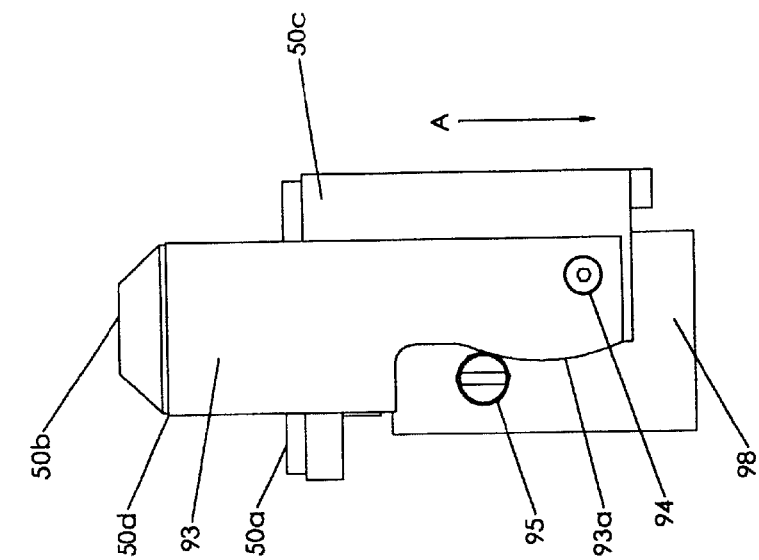
Figure 10B:
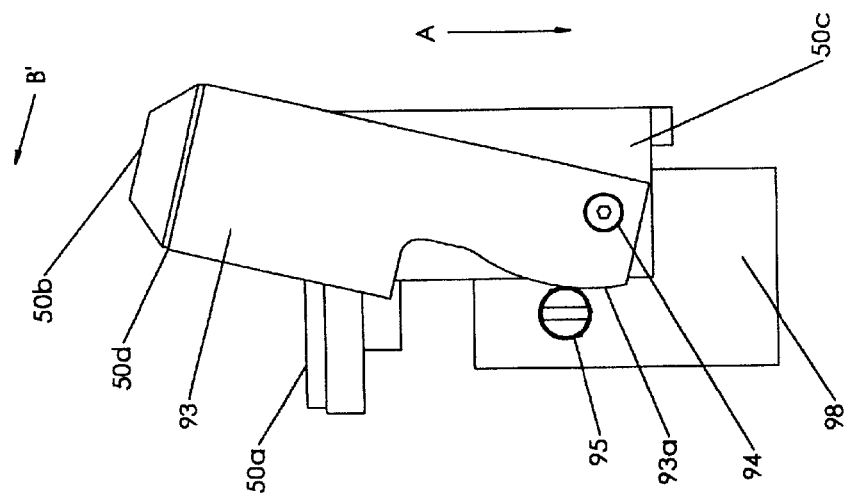
Figure 10A:
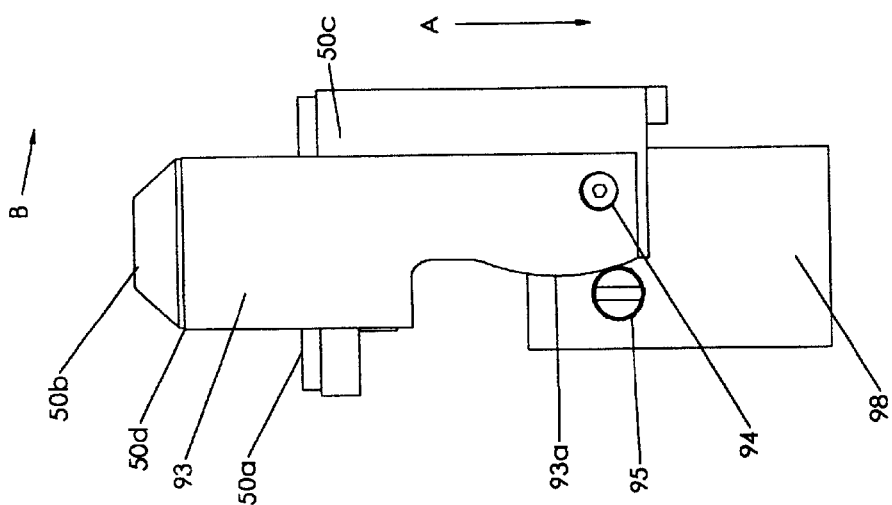

In a second, and more preferred, embodiment of bar 93, edge 93a is an arc-shaped surface which contacts pin 94 at a recessed point 93b at the lower end of bar 93 when the frame 50c occupies its uppermost position (FIG. 10a; although housing 98 is not shown, pin 95 is rigidly fixed to housing 98). Edge 93a curves outwardly from point 93b to point 93c, and then curves inwardly from point 93c to point 93d. When the frame 50c moves vertically from its uppermost position downward in the direction of arrow A by a distance equal to the vertical distance between points 93b and 93c to a second frame position, pin 95 pushes against edge 93a so as to cause bar 93 to swing outwardly from its first position in the direction of arrow B. When frame 50c occupies its second position, pin 95 presses against point 93c along edge 93a, pushing bar 93 into its second position and moving lens 50b out of the path of the light beam (FIG. 10b). When frame 50c continues to move downwardly from the second frame position in the direction of arrow A by a distance equal to the vertical distance between points 93c and 93d to a third, lowermost frame position, the pressure exerted by pin 95 against edge 93a is reduced, allowing bar 93 to swing inwardly in the direction of arrow B' from its first position. When frame 50c occupies its third, lowermost, position, pin 95 is positioned adjacent to point 93d along edge 93a, and exerts essentially no outward pressure on bar 93 (FIG. 10c). This allows bar 93 to occupy its first position, where lens 50b is positioned in the path of the light beam.

Preferably, a biasing means, such as a spring, retains the bar 93 in its first position, where lens 50b is positioned in the path of the beam of light, when frame 50c occupies either the first frame position or the third frame position.

For transmitted light systems, Koehler illumination is achieved by optimizing condenser lens focus, aperture diaphragm opening, and field diaphragm opening. This is done using the following procedure:

a) Focus the image and then position the substage condenser lens 50 at a point where the edge of the aperture in the field diaphragm 54 is in focus.

b) Open the aperture in the aperture diaphragm 53 to from ⅔ to ⅘ of the opening of the condenser lens 50.

c) Set the field diaphragm opening so that the on-screen shadow of the field diaphragm 54 is just beyond the microscope's field-of-view.

This procedure must be followed each time a new objective lens is used with the microscope, as the correct settings are different for each objective lens. In particular, it is important to change the size of the opening in the aperture diaphragm each time the objective lens is changed so that the numerical aperture of the diaphragm matches that of the objective lens.

The microscope of this invention is adapted to be placed under computer control. All key operations, including magnification, image focusing and sample positioning, are remotely accomplished from the computer. This relieves the operator from stress-induced fatigue resulting from maintaining the rigid posture required to operate other microscopes.

The degree of magnification to which an image is subjected is controlled by the computer. The operator enters a desired magnification. After the computer receives this input, it selects an objective lens having the desired magnification from among the objective lenses mounted on the plate 2. The computer then sends a signal to stepper motor 7. This signal causes motor 7 to rotate screw 8 until the selected objective lens is positioned in the path of a light beam "A" coming from the direction of the sample.

Focus adjustment is achieved by moving tube 3a vertically up or down relative to plate 11 using the screw rotatably mounted to plate 11, as previously described. This adjusts the focus of the observed image by varying the distance between the stage and the objective lens. Rotation of the screw is performed by a stepper motor, preferably a 0.45° step angle stepper motor, which is under the control of a computer. If an observed image is out of focus, the operator directs the computer to move the objective lens vertically toward or away from the stage. The computer then sends a signal to the stepper motor causing the stepper motor to rotate the screw. Depending on the direction of rotation, tube 3a is then moved vertically up or down. Once the image is in focus, the operator instructs the computer to stop the movement of tube 3a. The position of tube 3a at this time may be stored in memory. The stored tube position can be recalled at a later time, and the computer can automatically return tube 3a to this position.

Stage position may also be placed under computer control. The stepper motors rotating screws 24 and 28 are adapted to receive instructions from a computer. An operator enters a distance which he desires the stage to travel in the x-direction. The computer responds by rotating screw 28 until plate 22 has traveled for the desired distance. Similarly, if the operator requests that the stage travel a desired distance in the y-direction, the computer rotates screw 24 until plate 20 has traveled for the desired distance. Alternatively, the operator may use x, y coordinates to specify a position that he wishes to have placed at the center of the field-of-view. The computer will cause the stepper motors to rotate screws 24 and 28 until this site is correctly positioned. If the stage is adapted to rotate, the stepper motor rotating the stage may be placed under computer control. If an operator instructs the computer that he wishes to rotate the viewed image a defined number of degrees about the z-axis, the computer will instruct the stepper motor rotating the stage to rotate the stage by the desired amount.

The computer is also adapted to store, for each objective lens individually, the correct settings for diaphragms 53 and 54 in the illumination system. Each time an objective lens is changed, the computer can recall the stored settings for the diaphragms and automatically reset them. If necessary, the operator can instruct the computer to change the diaphragm settings at will.

Finally, the computer can store the image focused onto the imaging plane of the video camera in a memory. This stored image can then be recalled at a later time and sent to a video monitor.

What is claimed is:

1. A microscopy system, comprising:
    a) a stage for supporting a sample;
    b) a means for directing a vertical beam of light through the sample;
    c) a video camera having a defined imaging plane; and
    d) an optical system, comprising:
        i) a plurality of light-transmitting objective lenses arranged in a linear array on a first plate, including at least a first objective lens positioned in the path of the vertical beam of light and a second objective lens not positioned in the path of the vertical beam of light; and
        ii) a lens system positioned in a tube having an axis which is parallel to the vertical beam of light, said lens system being adapted to receive the vertical beam of light after it has been transmitted through the first objective lens and focus the vertical beam of light onto the imaging plane of the video camera;
    e) a second plate, rigidly fixed to the tube containing the lens system, where the first plate is slidably fixed to the second so that the first plate may move along the second plate until the first objective lens moves out of the path of the vertical beam of light and the second objective lens moves in to the path of the vertical beam of light; and
    f) a means for moving the first plate along the second plate until the first objective lens moves out of the path of the vertical beam of light and the second objective lens moves into the path of the vertical beam of light under computer control.

2. The system of claim 1, wherein the means for moving the first plate along the second plate comprises:
    a) a stepper motor rigidly connected with the second plate;
    b) a threaded screw rotated by the stepper motor;
    c) a threaded nut driven by the screw, said nut being rigidly connected with the first plate; and
    d) a computer;
    wherein the computer is adapted to either (a) signal the stepper motor to rotate the screw at a predetermined rate in a forward direction for a period of time sufficient to cause the screw to drive the nut for a distance sufficient to move the first plate from a position in which the first objective lens is positioned in the path of the vertical beam of light to a position in which the second objective lens is positioned in the path of the vertical beam of light; or (b) signal the stepper motor to rotate the screw at a predetermined rate in a reverse direction for a period of time sufficient to cause the screw to drive the nut for a distance sufficient to move the second plate from a position in which the second objective lens is positioned in the path of the vertical beam of light to a position in which the first objective lens is positioned in the path of the vertical beam of light.

3. The system of claim 1, further comprising:
    a memory means adapted to record the image focused onto the imaging plane of the video camera and store the recorded image; and
    a means for transmitting the recorded image to a video monitor.

4. The system of claim 1, wherein the means for moving the first plate along the second plate is under computer control.

5. The system of claim 1, further comprising a means for adjusting the focus of the image on the imaging plane of the video camera.

6. The system of claim 5, wherein the focus-adjustment means comprises a means for altering the distance traveled by the vertical light beam to reach the objective lens positioned in the path of the vertical beam of light.

7. The system of claim 6, wherein the focus-adjustment means comprises a rack-and-pinion system, comprising:
    a vertical rack mounted on a horizontal support plate;
    a rotatable pinion engaging the rack, said pinion being connected with the tube containing the lens system; and
    a computer-controlled means for rotating said pinion.

8. The system of claim 5, wherein the focus-adjustment means comprises:
    a threaded vertical screw rotatably mounted on a rigid vertical support plate;
    a nut driven by the threaded vertical screw, said nut being connected with the tube containing the lens system; and
    a means for rotating the vertical screw;
        wherein rotation of said vertical screw causes said nut and the objective lens turret attached thereto to move vertically.

9. The system of claim 8, wherein the means for rotating the vertical screw is under computer control.

10. The system of claim 1, wherein the means for supporting a sample is a light-transmitting stage adapted to move the sample in a horizontal plane.

11. The system of claim 10, wherein the stage comprises:
    a) a first light-transmitting horizontal support plate;
    b) a second light-transmitting horizontal plate mounted on the first support plate, said second plate being adapted to reversibly move horizontally in a first direction under computer control; and
    c) a third light-transmitting horizontal plate mounted on the second plate, said third plate being adapted to reversibly move horizontally in a second direction under computer control, said second direction being orthogonal to the first direction.

12. The system of claim 11, wherein the stage additionally comprises:
    d) a means for rotating the sample.

13. The system of claim 1, wherein the means for producing a vertical beam of light comprises a second lens system adapted to transmit a beam of light from a light source to a condenser lens system, said condenser lens system being adapted to concentrate the beam of light transmitted from the light source and direct the concentrated beam of light upwards through the stage, said stage being light-transmitting.

14. The system of claim 13, wherein the condenser lens system is a single fixed lens.

15. The system of claim 13, wherein the condenser lens comprises a first lens positioned in the path of the beam of light from the light source, a second lens positioned in the path of the beam of light from the light source between the first fixed lens and the light-transmitting stage, and a means for reversibly moving the second lens out of the path of the beam of light from the light source under computer control.

16. The system of claim 15, wherein the condenser lens system comprises:

a first fixed lens in the path of the beam of light from the light source, said first fixed lens being mounted in a first frame which is adapted to move reversibly in a vertical direction under computer control;

a second lens mounted in a second frame which is rigidly attached to a bar, said bar being movably attached to the rigid frame by means of a hinge;

wherein, when the first frame moves vertically, a shaped surface on the bar interacts with an immobile pin so as to cause the bar to swing from a first bar position where the second lens is positioned in the path of the beam of light from the light source to a second bar position where the second lens is not positioned in the path of the beam of light from the light source.

17. A microscopy system, comprising:

a) a stage for supporting a sample;

b) a means for directing a vertical beam of light through the sample;

c) a means for observing an image carried by the beam of light; and d) an optical system, comprising:
      i) a plurality of light-transmitting objective lenses arranged in a linear array on a first plate, including at least a first objective lens positioned in the path of the vertical beam of light and a second objective lens not positioned in the path of the vertical beam of light; and
      ii) a lens system adapted to receive the vertical beam of light after it has been transmitted through the first objective lens and focus the vertical beam of light onto the imaging plane of the video camera;

e) a second plate, rigidly connected with the lens system, where the first plate is slidably fixed to the second plate so that the first plate may move along the second plate until the first objective lens moves out of the path of the vertical beam of light and the second objective lens moves into the path of the vertical beam of light; and f) a means for moving the first plate along the second plate until the first objective lens moves out of the path of the vertical beam of light and the second objective lens moves into the path of the vertical beam of light under computer control.

* * * * *